（12) United States Patent
Gracey

(10) Patent No.: US 7,155,789 B1
(45) Date of Patent: Jan. 2, 2007

(54) CUTTER ADJUSTMENT SYSTEM

(76) Inventor: Doyle D. Gracey, P.O. Box 155, Tehachapi, CA (US) 93581

( * ) Notice: Subject to any disclaimer, the term of this patent is extended or adjusted under 35 U.S.C. 154(b) by 38 days.

(21) Appl. No.: 10/899,571

(22) Filed: Jul. 26, 2004

(51) Int. Cl.
B23D 21/00 (2006.01)

(52) U.S. Cl. .................. 29/33 T; 86/19.7; 407/43; 407/70; 407/97

(58) Field of Classification Search ........... 86/19.7, 86/10; 29/33 T; 30/94, 102; 407/43, 70, 407/97; 408/24, 42; 409/192, 203; 82/113
See application file for complete search history.

(56) References Cited

U.S. PATENT DOCUMENTS

| 2,359,954 | A | * | 10/1944 | Whipple | 86/19.7 |
| 2,744,307 | A | * | 5/1956 | Smiley | 86/19.7 |
| 2,835,293 | A | * | 5/1958 | Mackey | 408/200 |
| 3,703,036 | A | * | 11/1972 | Karubian | 30/339 |
| 3,827,119 | A | * | 8/1974 | Bennett | 407/40 |
| 3,927,584 | A | * | 12/1975 | Mayfield | 82/113 |
| 4,364,290 | A | * | 12/1982 | Astle | 82/158 |
| 4,686,751 | A | * | 8/1987 | Gracey | 86/19.7 |
| 5,649,464 | A | * | 7/1997 | Gracey | 86/36 |
| 5,727,295 | A | * | 3/1998 | Gracey | 86/19.7 |
| 5,788,429 | A | * | 8/1998 | Gracey | 408/80 |
| 6,000,449 | A | * | 12/1999 | De Marco | 144/219 |

* cited by examiner

Primary Examiner—Monica Carter
Assistant Examiner—Eric A. Gates
(74) Attorney, Agent, or Firm—Kenneth G. Pritchard

(57) ABSTRACT

An improvement for a cartridge case trimmer which indexes on the shoulder of the case as established by the resizing die and permits a rotating cutter assembly to trim the neck of cases from the inside at a controllable angle. The cutter assembly includes a notched cutter with a cutting edge for length, a cutting edge for inside chamber, and a notched support plate with a guide which also serves as an outside deburring edge. The rotating cutter assembly has a flywheel mounted to it so as to stabilize the cutter while rotating to reduce the tendency to wobble. Set screws fit within the notches of the notched cutter and notched support plate to both hold them in place and to adjust them independently for the desired shape of the trimmed cartridge case neck.

3 Claims, 2 Drawing Sheets

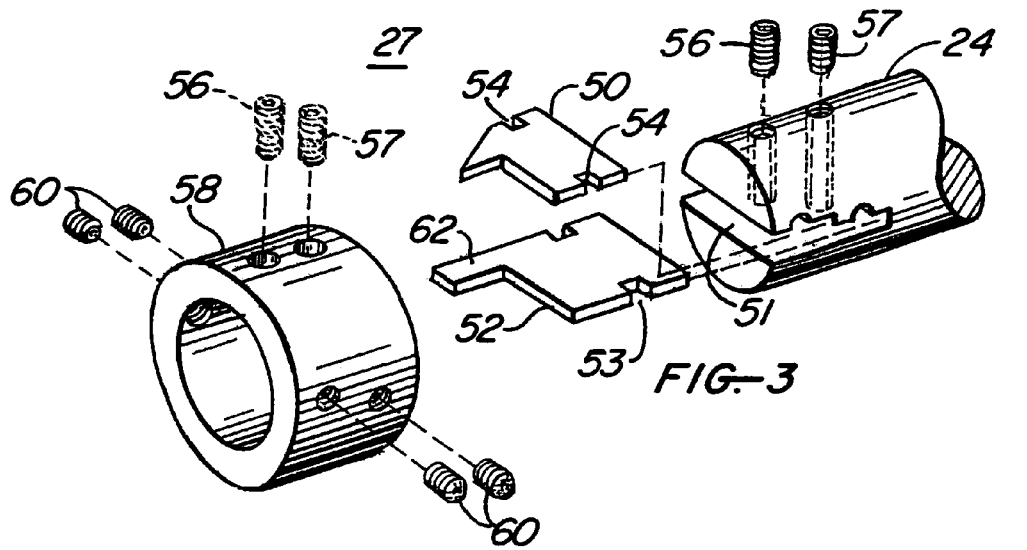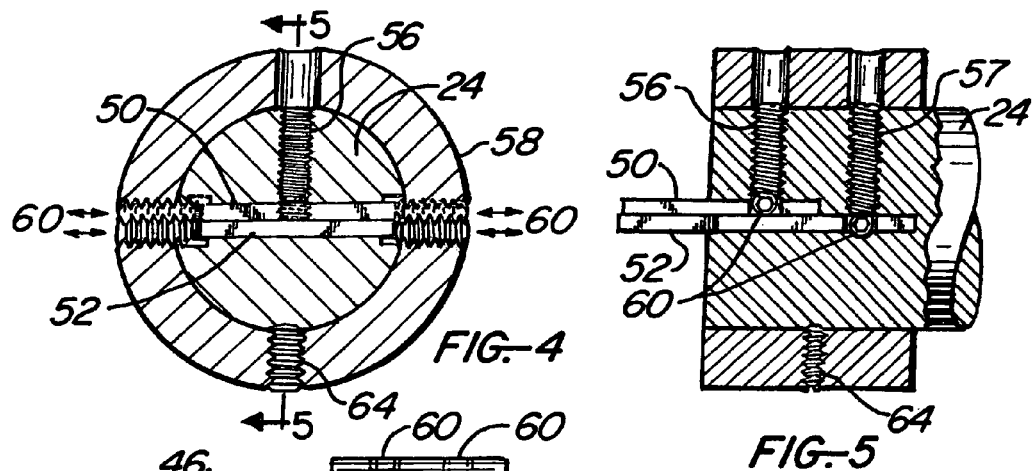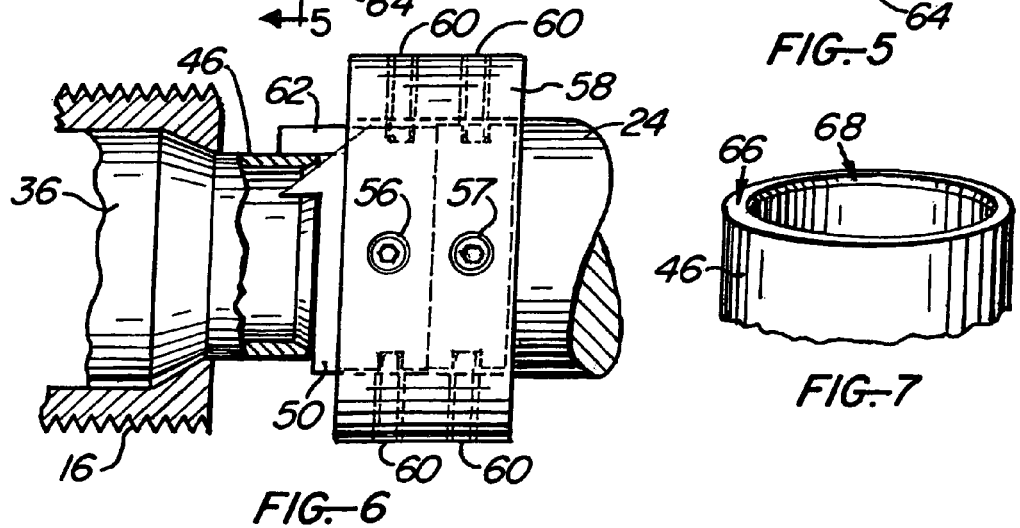

CUTTER ADJUSTMENT SYSTEM

BACKGROUND OF THE INVENTION

1. Field of the Invention

This invention relates to devices which resize and redimension spent cartridge cases, including deburring, reaming and cleaning of the cartridge case. Specifically, this invention pertains to cartridge case trimmers that trim the neck of cartridge cases by indexing on the shoulder of the case as established by the resizing die.

2. Description of the Prior Art

The first cartridge case trimmer to index on the shoulder of the cartridge was U.S. Pat. No. 4,686,751 to Doyle D. Gracey. Prior to this all known devices indexed on the head of the cartridge. This prior art device avoided burrs on the inner and outer edges and saved separate use of a deburring stage. It also avoided a chamfer on the outer edge which is a historic safety concern. To accomplish this it was imperative to keep alignment of the cutter with the case. Since this prior art device cuts when a case was pushed into it until nothing was left to cut away, instability develops in the form of shaft wobble. Over time this wobble grows until the cutting becomes erratic and the trimming is no longer uniform from cartridge case to cartridge case. A further limitation of the prior device is that everything is set for a desired caliber. To cut cases for a different caliber, it was easier to have a separate device than to reconfigure the device for a different caliber. The prior device could have alignment problems for the cutting to match the cartridge.

Accordingly it is an object of the present invention to allow uniform cutting based on the shoulder of a cartridge case while allowing the shaft of the rotating cutter to remain stable when it encounters the resistance from the actual cutting such that a significantly longer usable cutting life is created.

It is a further object of the invention to allow a single device to be easily modified so it can cut different caliber cases.

It is a further object of the invention to allow the cutter setting to be easily adjustable.

SUMMARY OF THE INVENTION

A base is formed to have a bearing housing and case holder housing. The bearing housing supports a shaft. The shaft has a driver such as a crank or motor at one end and a cutter mounted to the opposite end of the shaft. The cutter is mounted to the shaft via a flywheel housing which is attached to the shaft. The flywheel housing permits the cutter to be adjusted back and forth as desired. The cutter has at least one notch such that after the cutter is set in place for a desired caliber, a further pin or set screw can be placed into the notch so the cutter is not able to work its way out while cutting.

BRIEF DESCRIPTION OF THE DRAWINGS

FIG. 3 is a disassembled view of the current invention.
FIG. 4 is a cross section view of the cutter assembly for the present invention along the axis of rotation.
FIG. 5 is a cross sectional view of the cutter assembly for the present invention parallel to the axis of rotation.
FIG. 6 is a partial cross section of the present invention trimming a cartridge neck.
FIG. 7 is a perspective view of a trimmed cartridge neck.

DESCRIPTION OF THE PREFERRED EMBODIMENT

Figure 1:
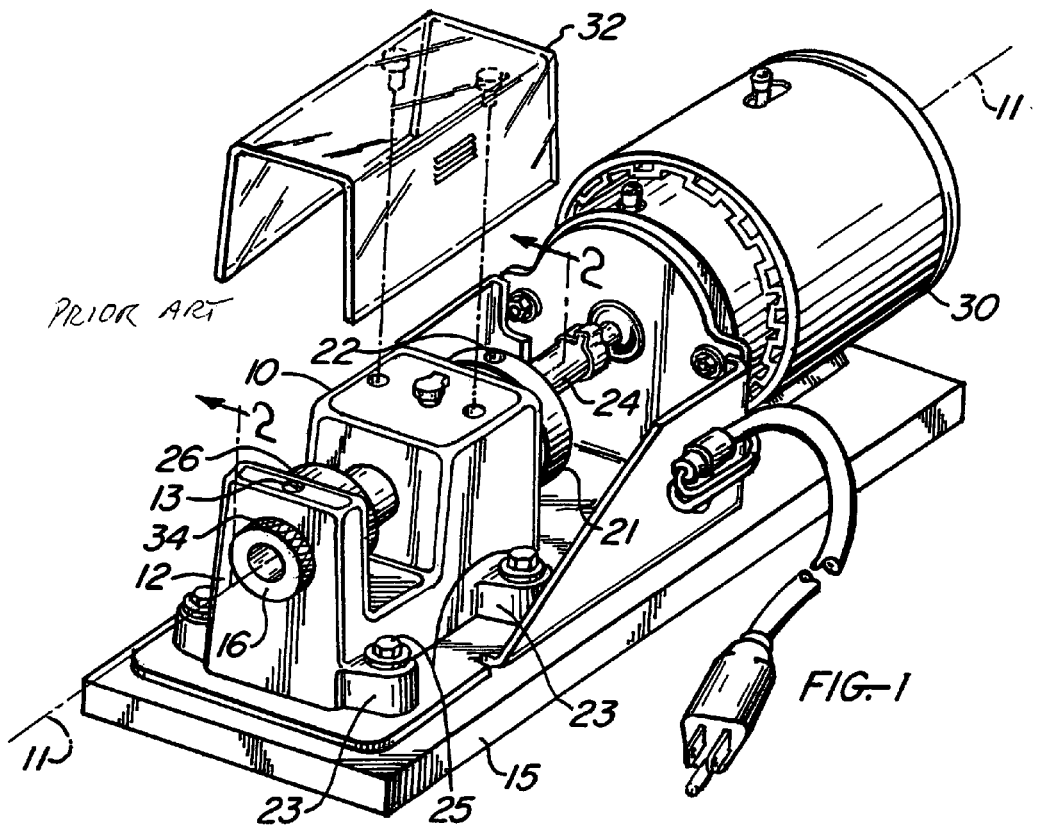
FIG. 1 is a perspective view of the prior art.

FIG. 1 shows a prior art cartridge case trimmer with a block 10 of cast or machined metal such as aluminum. Block 10 is formed to have a cartridge case holder housing 12 which is axially aligned with a bearing housing 14 shown in FIG. 2 along axis 11 as shown. Within case holder housing 12, a case holder 16 is mounted, possibly by threads 18 shown in FIG. 2 or any other suitable method which provides a firm hold on case holder 16. One way to lock case holder 16 in position is with a set screw 13. Threads 18 also permit case holder 16 to be set at an exact position. Within bearing housing 14 a bearing 20 is mounted in any of the known ways to mount a bearing. A shaft 24 is mounted within bearing 20 and held in place by a shaft retainer 21 via set screw 22, such that it is free to rotate. Shaft retainer 21 may be changed for any means for holding shaft 24 in place. As shaft 24 wears within 20, adjusting shaft retainer 21 forward will maintain a snug fit. If shaft 24 is harder than bearing 20, it is bearing 20 that wears away. Block 10 has ears 23 for bench bolts 25. Ears 23 may be shaped as desired. Ears 23 allow block 10 to be rigidly mounted to a bench 15 or other working platform, not shown.

Shaft 24 has a cutter assembly 26 on one end and an end 28 which is on the opposite side of bearing 20 when shaft 24 is mounted in bearing 20. A handle, not shown, such as a hand crank may be used to rotate cutter assembly 26 via end 28 and shaft 24. A motor 30 may be used to rotate end 28. Rotation of end 28 in turn rotates cutter assembly 26. The use of motors and hand cranks are well known. End 28 may also be sized so that it may be driven by an electric drill where end 28 is inserted into the drill chuck instead of a drill bit. Motor 30, drill bits, and hand cranks are merely examples of means for turning shaft 24. The void between bearing housing 14 and case holder housing 12 may be covered by a clear plastic cover 32. Cover 32 prevents injury to users caused by small chips of metal thrown by cutter assembly 26.

Figure 2:
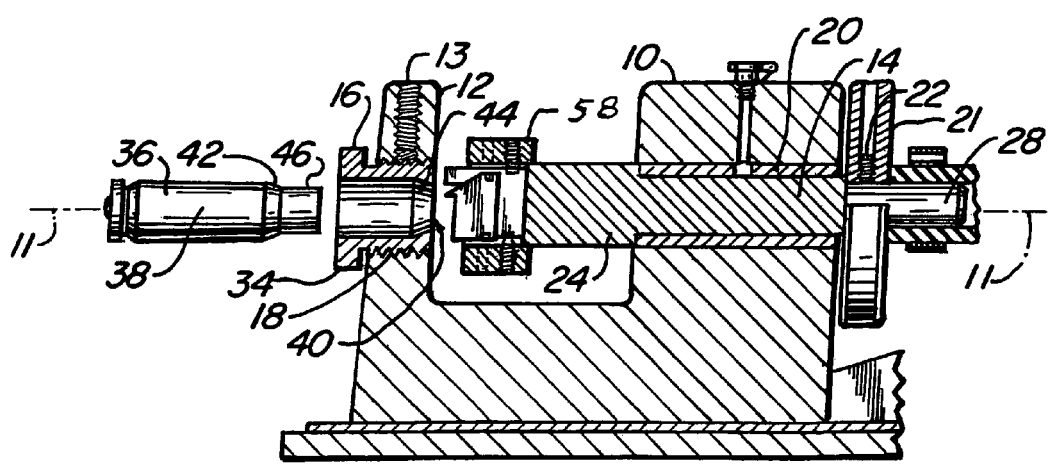
FIG. 2 is a cut away view of a case holder for the prior art.

FIG. 2 is a cross-sectional view of FIG. 1 with the addition of the present invention. The present invention is represented generally by flywheel 58 which will be described in detail for later Figures. Flywheel 58 is the improvement for prior art cutter assembly 26 of FIG. 1. Flywheel 58 not only fits over shaft 29 but is placed so no air space is present between flywheel 58 and shaft 24 as shown in FIG. 2. Flywheel 58 is mounted flush to shaft 24. In addition to mounting threads 18, a knurled surface grip 34 may be added for ease in screwing case holder 16 into or out of case holder housing 12. Along axis 11, case holder 16 has an opening which is shaped to match a given cartridge case's external dimensions. A typical cartridge case 36 is shown. Cartridge case 36 has a main body 38 which is tapered and fits within tapered opening 40 of case holder 16. The length of opening 40 should be sufficiently shorter than body 38 so that enough of cartridge case 36 extends to hold by hand. For example, if the length of opening 40 is one third of the length of body 38, there is adequate length to grip. Shoulder 42 is stopped by a mating surface 44. Thus mating surface 44 is a shoulder stop for cartridge case 36. Neck 46 extends through case holder 16. The length of neck 46 is set by indexing on the shoulder of the cartridge case as established by the resizing die, not shown. Opening 40 is tapered to fit resizing cases. An un-resized case will not fit into opening 40. This serves as a safety check which prevents the mistake of trimming an un-resized case.

FIG. 3 is a disassembled view of the present invention, cutter assembly 27. A cutter 50 fits within a slot 51 on an end of shaft 24. A support plate 52 may be placed under cutter 50 within slot 51 to add strength to cutter 50. Cutter 50 has notches 54 in its ends. Support plate 52 has notches 53 which may or may not align with those in cutter 50. Set screw 56 holds cutter 50 and set screw 57 holds support plate 52 in position in slot 51. A flywheel 58 fits over cutter 50, support plate 52, and shaft 24. Set screws 56 and 57 also help attach flywheel 58 as shown. Additional set screws 60 attach flywheel 58 to shaft 24 and fit within notches 53 and 54 previously shown. In this embodiment, notches 53 and 54 are in separate positions. Set screws 60 are in aligned pairs, one pair for cutter 50 and another aligned pair for support plate 52. By varying the depth of each set screw 60 in a given aligned pair, cutter 50 or support plate 52 may be laterally adjusted if cartridge neck 46 is not in the proper position with respect to cutter 50. Flywheel 58 may be made of steel, aluminum or other material. In general the heavier the material the more stability is added during shaft 24's rotation for cutting. Use of lighter material aids in assembly and disassembly of the cartridge case trimmer and effects the load on a motor if a motor is used to turn shaft 24. Also any known mounting means may be used including but not limited to welding, rivets, pins, and so forth. The preferred embodiment uses set screws because of their ease of access if changes are desired.

FIG. 4 is a cross sectional view along axis 11 of an assembled cutter assembly 26. FIG. 4 shows an additional set screw 64 which helps hold flywheel 58 to shaft 24.

FIG. 5 is a cross sectional view of cutter assembly 27 along the 5—5 arrows shown in FIG. 4.

FIG. 6 is a top view of cutter assembly 27 with a partial cutaway showing case holder 16 with a cartridge case 36 in position for trimming of neck 46. Neck 46 is partially cut away. Support plate 52 has a guide 62, also shown in FIG. 3, attached or formed to be an integral part of support plate 52. When cartridge case 36 is inserted neck 46 is held in place by guide 52 and trimmed by cutter 50. The extent of neck 46 is limited by the shoulder stop of case hold 16. As shown guide 62 also serves as an outside edge deburring device for cartridge case neck 46. Set screws 60 adjust cutter 50 and support plate 52 with guide 62 up and down as shown in FIG. 6.

FIG. 7 shows the trimmed effect on neck 46 which includes a flat surface 66 and a chamfered surface 68. The width of flat surface 66 may be changed by moving cutter 50 via aligned set screws 60 as previously shown.

What is claimed is:

1. A trimmer for cartridge cases comprising:
    a base;
    a bearing housing mounted to said base;
    a shaft inserted into said bearing housing;
    means for holding said shaft within said bearing housing attached to said shaft;
    a cutter assembly mounted to said shaft, said cutter assembly further comprising a notched cutter with a first cutting edge for an inside chamber, a second cutting edge for length, and a deburring edge arranged so three distinct cuts are made on the mouth of said cartridge case;
    a case holder housing mounted to said base with an opening axially aligned with said shaft;
    a cartridge case holder mounted within said case holder with an opening shaped to match said cartridge case's external dimensions and a shoulder stop for indexing on the shoulder of said cartridge case;
    means for turning said shaft;
    a flywheel flush mounted to said shaft further comprising a slot that allows said notched cutter to extend through said flywheel assembly such that said flywheel assembly does not prevent said notched cutter's edges from cutting said cartridge cases, means to mount said notched cutter to said shaft, and at least one set screw in said flywheel assembly which fits within said notch such that cutting pressure when said trimmer is in use causes said notched cutter to resist wobbling due to said set screw filling said notch.

2. A trimmer for cartridge cases as described in claim 1 further comprising a notched support plate mounted beside said notched cutter;
    a guide mounted to said notched support plate to hold cartridge case neck in a desired position relate to said notched cutter and also serves as an outside deburring edge for said cartridge case; and
    the notch in said notched support plate aligned with at least one of said set screws in said flywheel such that said set screw may pass completely through said flywheel and into said notch in said notched support plate.

3. A trimmer for cartridge cases as described in claim 2 further comprising two aligned set screws which fit into notches on said notched cutter so that in addition to holding said notched cutter in position they also allow said notched cutter to be shifted as desired; and
    two aligned set screws which fit into notches in said notched support plate so that in addition to holding said notched support plate in position they also allow said notched support plate to be shifted as desired.

* * * * *